Aug. 7, 1934.  A. W. WOODWARD  1,969,193
VEHICLE WHEEL
Filed Nov. 2, 1929
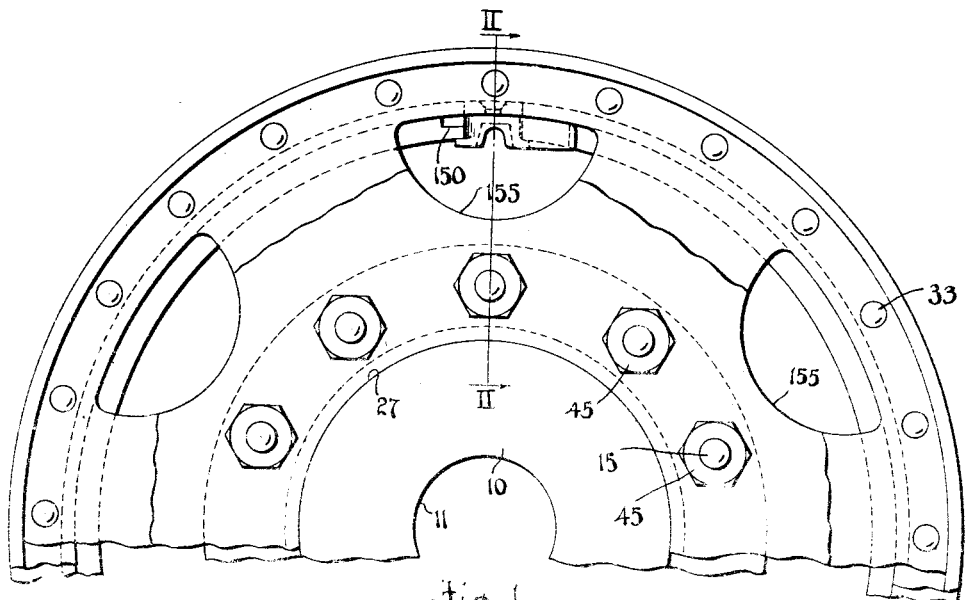
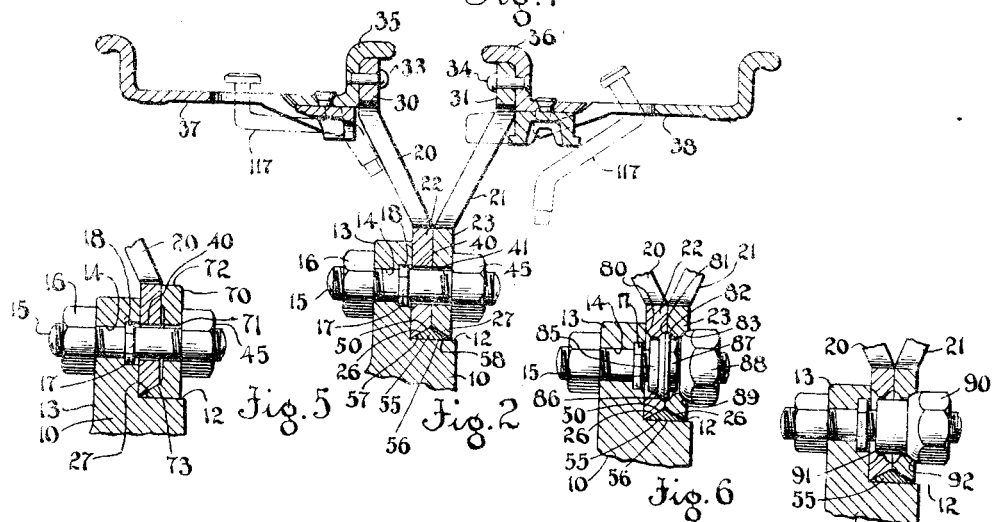
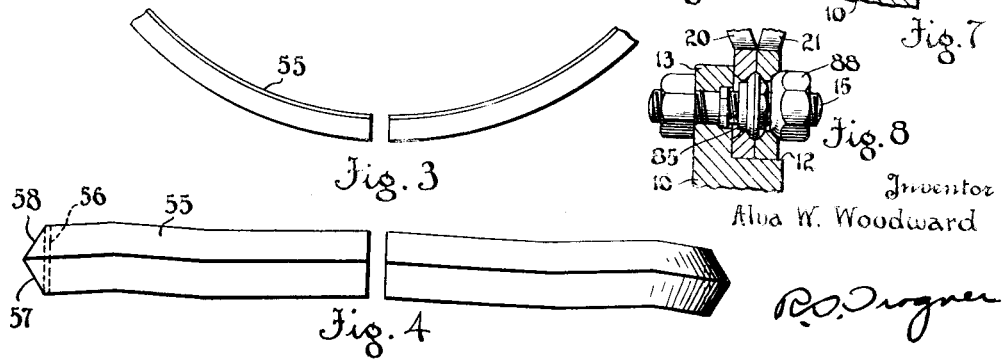
Inventor
Alva W. Woodward
Attorney Patented Aug. 7, 1934

1,969,193

UNITED STATES PATENT OFFICE 1,969,193

VEHICLE WHEEL

Alva W. Woodward, Akron, Ohio, assignor to Wingfoot Corporation, Wilmington, Del., a corporation of Delaware Application November 2, 1929, Serial No. 404,305

6 Claims. (Cl. 301—9)

This invention relates to vehicle wheels having a hub and tire rim supporting wheel members such as discs or members having spokes secured thereto, and it has particular relation to the means employed for supporting the wheel members on the hub.

One object of the invention is to provide a wheel composed of a hub and one or more wheel members removably secured thereto, and means, in addition to the securing means for supporting the wheel members on the hub in such manner that the radial loads imposed upon the latter are transmitted directly to the hub.

Another object of the invention is to provide a novel wheel assembly in which wheel members are removably secured to a hub and the outer peripheral parts of the wheel members are permanently secured to tire supporting rims.

As heretofore practiced, an ordinary means for securing wheel members, provided with central hub receiving openings, such as discs and those having spokes, to the hubs of vehicle wheels, comprised bolts projecting through openings in radial flanges on the hubs and through corresponding openings in the wheel members. The outer ends of the bolts were provided with nuts engaging respectively the flange on the hub and the outer wheel member for retaining the parts in assembled relation. The bolt receiving openings in the wheel members necessarily were of slightly greater diameter than that of the bolts projecting therethrough in order to facilitate the mounting of the members on the bolts. Owing to this fact, loads imposed upon the wheel members tended to move the discs relative to the bolts and the varying loads imposed upon the wheel members caused relative radial movement or slippage thereof. These movements of the wheel members both respectively and relative to the hub were very undesirable.

According to this invention, the central opening in each wheel member is conical and the members are oppositely disposed on the hub of the wheel. The central openings in the wheel members receive a cylindrical portion of the hub of the vehicle wheel and a split ring of V-shape cross-section is disposed between the sides of the conical surfaces defining the openings with its base resting upon the cylindrical portion of the hub. The inclined sides of the ring extend circumferentially in slightly serpentine formation. Hence, one inclined outer surface thereof engages the conical side of the opening in one wheel member at circumferentially spaced points whereas the other inclined surface of the ring engages the side of the conical opening in the other wheel member at circumferentially spaced points alternating with respect to the points at which the other inclined surface of the ring engages the first mentioned wheel member. By providing a construction of this character, each wheel member positively engages the ring which in turn is supported directly upon the hub and the wheel members are interchangeable.

Also, the invention contemplates the provision of a pilot nut for securing the lower portion of the inner wheel member on the hub in order that the inner wheel member will not interfere, by reason of movement, with the mounting of the outer wheel member on the hub. This nut is so related with the outer wheel member that it does not interfere with the latter and hence can be retained as a driving connection between the inner wheel member and the bolt upon which the nut is mounted. A desirable mounting is also provided by employing pilot nuts on all of the bolts projecting through the wheel members.

For a better understanding of the invention, reference may now be had to the accompanying drawing, forming a part of the specification, in which:

Fig. 1 is a fragmentary elevational view of a wheel embodying the principles of my invention;

Fig. 2 is a cross-sectional view taken substantially along the line II—II of Fig. 1;

Fig. 3 is a fragmentary elevational view of a ring employed in the construction shown by Figs. 1 and 2;

Fig. 4 is a view showing the entire ring as seen from the bottom side of Fig. 3;

Fig. 5 is a fragmentary cross-sectional view showing a means for securing one of a pair of wheel members on the hub of a wheel;

Fig. 6 is a fragmentary cross-sectional view illustrating a means for securing to the hub of a wheel a pair of wheel members having their bolt receiving openings counter bored on both sides;

Figs. 7 and 8 are fragmentary cross-sectional views showing other means for securing to the hub of a wheel a pair of wheel members having their bolt-receiving openings counterbored on both sides.

Referring to Figs. 1 and 2, a wheel hub 10 of ordinary construction is provided with a central axle receiving opening 11, an outer cylindrical wall 12 and a radially disposed flange 13 at one end of the latter. The flange 13 is provided with a series of circumferentially spaced openings 14, each of which receives a bolt 15, having a securing nut 16 one one end thereof. A shoulder 17 integral with an intermediate portion of each bolt is disposed in a recess 18 forming a portion of the openings 14 at the side of the flange opposite the nut 16. The opposite end of each bolt 15 receives a pair of outwardly diverging interchangeable wheel members 20 and 21 having central openings 26 and 27 respectively of substantially conical contour for receiving the cylindrical portion 12 of the hub. Adjacent their central openings the wheel members have radially disposed portions 22 and 23, respectively. These wheel members may be in the form of solid discs or they may be perforated to form spokes. The outer edge portions of the wheel members also are directed radially as indicated at 30 and 31 and are secured by rivets 33 and 34 to the endless side ring 35 and 36 of a pair of rims 37 and 38. Openings 40 and 41 provided in the radially disposed portions 22 and 23 of the wheel members receive the bolts 15, and nuts 45, threaded on the outer ends of the bolts, retain the wheel members on the latter.

It will be observed that the tapered faces defining the central openings 26 and 27 converge and meet in such manner as to provide an annular groove 50 of V-shape in cross-section. A split locking ring 55 of V-shape in cross-section and slightly smaller than the recess 50 is disposed in the latter recess. This ring, as particularly shown by Fig. 4, is of slightly serpentine form. Its base 56 rests directly on the cylindrical portion 12 of the hub while its inclined outer srufaces 57 and 58 owing to the serpentine form of the ring, engage the surfaces of the groove 50 at circumferentially spaced points. It is apparent that the surfaces 57 and 58 of the ring alternately engage the tapered surfaces defining the openings 26 and 27, respectively. Hence, each wheel member is directly supported by the cylindrical portion of the hub through the instrumentality of the ring 55. This ring also serves as a spring between the wheel members, thereby urging them away from each other and providing a constant axial pressure against the nuts 45 on the bolts 15, even though the nuts become slightly loosened.

Figure 5 discloses a means for securing a single wheel member 20 on the bolts 15. This means comprises a plurality of resilient clamps 70, each of which is provided with an opening 71 for receiving the bolt 15. The radial outer ends of the clamps have portions 72 directed toward and abutting the wheel member 20 whereas the inner ends have wedges 73 projecting between the tapered surface defining the opening 26 and the cylindrical portion 12 of the hub. By tightening the nuts 45 on the bolts 15, the clamping members 70 are moved against the wheel member and the wedges 73 are secured partially within the conical openings 26. Thus the wheel member is rigidly secured in position. If desired, a clamping ring, either endless or split at one point, may be employed in place of the clamps 70.

Figure 6 relates to a construction in which the radial portions 22 and 23 of the wheel members 20 and 21 have their bolt receiving openings counterbored on both sides, as indicated respectively at 80—81 and 82—83. In order to secure the inner wheel member 20 on the bolts 15 at least temporarily until the outer wheel member 21 is mounted on the bolts, a pilot nut 85 having a tapered surface 86 and a hexagonal head 87 is threaded on one of the lower bolts 15 until the surface 86 engages the side of the corresponding counterbored opening 81 in the wheel member 20. Then the outer wheel member 21 is disposed on the bolts, and nuts 88, having tapered surfaces 89, are threaded on the latter until the surfaces 89 thereof engage the counterbored surfaces 83 of the bolt receiving openings in the wheel member 21. The axial length of the pilot nut is such that it does not interfere with the wheel member 21 or the outer nut mounted on the same bolt. In addition to serving as a means for temporarily securing the inner wheel member in position, the pilot nut provides a driving connection between the inner wheel member 20 and the bolts 15 and also for preventing relative radial movement of the latter and the wheel member. Also, in the construction shown by Fig. 6, the wheel members 20 and 21 have their inner peripheral edges inclined as shown by Fig. 2, and between such inclined edges a serpentine ring 55 is disposed. This ring serves a purpose similar to that for which it is employed in Fig. 2.

Figure 7 discloses a construction similar to that shown by Fig. 6 with the exception that instead of employing the pilot nut 85 and the nuts 88, nuts 90 are employed which have shanks 91 adapted to project through the openings in both of the wheel members 20 and 21. These nuts also have tapered surfaces 92 adapted to engage the tapered sockets in the outer wheel member. The shanks 91 are of such diameter that they substantially contact with the edges of the openings in the inner wheel member 20 and hence serve as driving connections between the inner wheel member and the hub. Also, the shanks 91 assist in preventing relative radial movement of the wheel members 20 and 21.

Figure 8 illustrates a construction similar to that shown by Fig. 6 with the exception that the inner edges of the wheel members 20 and 21 are not inclined, and, hence a serpentine ring 55 is not employed. Moreover, in this construction, a pilot nut 85 may be employed on each of the bolts 15 for positively securing the inner wheel member on the hub.

From the foregoing description, it is apparent that a wheel has been provided in which one or more wheel members are directly supported upon a hub instead of being supported alone by bolts removably securing the wheel member to the hub. This is highly desirable where a pair of wheel members are employed because it not only prevents radial slippage between the wheel members but also relieves the strain on the bolts. In addition, the serpentine ring provided between the wheel members and the hub serves as a spring tending to prevent accidental loosening of the nuts 45 from the outer ends of the bolts owing to the fact that the ring tends to separate the wheel members laterally.

Also, it is apparent that means have been provided for retaining the inner of a pair of wheel members in position at least temporarily until the outer wheel member is positioned on the bolts, and that this means serves as a driving connection between the inner wheel member and the bolts.

Moreover, it is apparent that novel and efficient means have been provided for securing the outer peripheral parts of wheel members to rims and especially to rims composed of transversely split base portions and endless side rings. The latching device provided for retaining the transversely split base portion and endless side ring in securely locked relation is particularly adapted for employment in wheel assemblies of the character described in which the outer peripheral parts of the wheel members are secured to the endless side rings.

Although I have illustrated the preferred forms which the invention may assume and have described those forms in detail, it will be apparent to those skilled in the art that the invention is not so limited but that various modifications may be made therein without departing from the spirit of the invention or from the scope of the appended claims.

What I claim is:

1. A vehicle wheel comprising outer and inner annular members, means for detachably connecting the members and means including a circumferentially extending member disposed between the members for positively relaying a load imposed upon one member to the other member, said circumferentialy extending member having a serpentine formation.

2. A vehicle wheel comprising an inner annular member and a pair of outer annular members having central openings for receiving a portion of the inner member, means including axially extending bolts for detachably connecting the members, and a transversely split member annularly disposed between the inner member and the inner peripheral edges of the outer members, said transversely split member having a slightly serpentine formation relative to the inner edges of the wheel members.

3. The combination of a hub having an outwardly projecting flange on its outer surface, a pair of annular wheel members having central openings for receiving the hub, the edges of such openings having oppositely inclined adjacent surfaces, means for removably securing the wheel members to the flange on the hub, and a circumferentially extending member disposed between the wheel members and the hub and having surfaces inclined similarly to the inclined surfaces on the inner edges of the wheel members, said circumferentially extending member having a slightly serpentine formation.

4. The combination of an inner wheel member and a pair of outer wheel members having central openings for receiving the inner member, means for detachably securing the wheel members, the inner edges of the outer wheel members having oppositely inclined adjacent surfaces, and a circumferentially extending member of V-shape in cross-section disposed in the groove, the base of the latter resting on the inner member, said circumferentially extending member having a slightly serpentine formation relative to the inclined surfaces of the inner edges of the outer wheel members, whereby normally it contacts with such surfaces at spaced points.

5. The combination of an annular inner wheel member and a pair of annular outer wheel members having central openings for receiving the inner member, means for detachably connecting the inner and outer wheel members together, the inner edge of the outer wheel members having oppositely inclined adjacent surfaces, and a circumferentially extending member, of V-shape in cross-section, disposed between the inner and outer wheel members, the base of the V-shaped member resting on the inner member and having the slanting sides of the V-shaped member engaging with the inclined surfaces of the outer wheel members, said V-shaped member being slightly serpentine in a circumferential direction relative to the inclined surfaces of the inner edges of the outer wheel members whereby normally the outer wheel members contact with the V-shaped serpentine member at spaced points.

6. In combination, a hub, a pair of wheel members fitting over the hub, a plurality of axially extending bolts secured to the hub and extending through openings in the wheel members, means on each bolt for securing said wheel members to the hub, and means including a sinuous ring for directly relaying the load between the hub and wheel members.

ALVA W. WOODWARD.